(12) United States Patent
Yoneda

(10) Patent No.: US 10,663,415 B2
(45) Date of Patent: May 26, 2020

(54) ANALYSIS DEVICE

(71) Applicant: Shimadzu Corporation, Kyoto (JP)

(72) Inventor: Tetsuya Yoneda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/098,194

(22) PCT Filed: Jun. 27, 2016

(86) PCT No.: PCT/JP2016/068949
§ 371 (c)(1),
(2) Date: Nov. 1, 2018

(87) PCT Pub. No.: WO2018/002979
PCT Pub. Date: Jan. 4, 2018

(65) Prior Publication Data
US 2019/0145918 A1 May 16, 2019

(51) Int. Cl.
*G01N 23/223* (2006.01)
*G01N 23/2204* (2018.01)

(52) U.S. Cl.
CPC ....... *G01N 23/223* (2013.01); *G01N 23/2204* (2013.01); *G01N 2223/076* (2013.01); *G01N 2223/1016* (2013.01); *G01N 2223/624* (2013.01)

(58) Field of Classification Search
CPC ............. G01N 23/223; G01N 23/2204; G01N 2223/076; G01N 2223/1016; G01N 2223/624

USPC .................................................... 378/44–45
See application file for complete search history.

(56) References Cited

FOREIGN PATENT DOCUMENTS

| JP | H06-331574 A | | 12/1994 |
|---|---|---|---|
| JP | 2003215073 A | * | 7/2003 |
| JP | 2003215073 A | | 7/2003 |
| JP | 2011241882 A | | 12/2011 |

OTHER PUBLICATIONS

International Search Report dated Aug. 30, 2016 of corresponding International Application No. PCT/JP2016/068949; 2 pgs.

* cited by examiner

*Primary Examiner* — Courtney D Thomas
(74) *Attorney, Agent, or Firm* — Maier & Maier, PLLC

(57) ABSTRACT

An analyzer capable of having a pressure value converge to a set vacuum value P in a short time is provided. An analyzer includes a sample chamber in which a sample is placed, an analysis chamber including an X-ray tube and a detector, a gate valve switching between a connecting state where the inside of the sample chamber and the inside of the analysis chamber are connected together and a disconnecting state where the insides of the chambers and are disconnected from each other, a vacuum pump and a pressure regulatory valve connected to the inside of the sample chamber and the inside of the analysis chamber, and a control unit controlling the degree of opening of the pressure regulatory valve to set the internal pressure of the sample chamber and the internal pressure of the analysis chamber at respective set pressure values in the connecting state.

4 Claims, 4 Drawing Sheets

ANALYSIS DEVICE

TECHNICAL FIELD

The present invention relates to an analyzer, and particularly relates to an X-ray fluorescence analyzer that acquires information on an element contained in a sample.

BACKGROUND ART

A wider variety of irons and steels (for example, low-alloy steel, carbon steel, stainless steel, and low-alloy cast iron) and non-ferrous metals having higher quality and development of steel making and processing techniques make it increasingly necessary to strictly control the amount of a trace element, particularly the amount of an element such as C, Si, S, P, Mn, and Ni, contained in a base material (for example, Fe, Cu, and Al). At a manufacturing plant or other similar sites for iron and steel materials and non-ferrous metal materials, a trace element contained in a base material is thus to be quantified in steel making and refining processes. An X-ray fluorescence analyzer is therefore now widely employed at such manufacturing plants and other places to quantitatively and qualitatively analyze an element contained in a sample by irradiating the sample with primary X-rays and detecting the intensity of fluorescent X-rays excited by the primary X-rays and discharged (for example, see Patent Document 1).

FIG. 3 is a schematic diagram of a configuration of a known simultaneous X-ray fluorescence analyzer. A simultaneous X-ray fluorescence analyzer 101 includes a preliminary exhaust chamber (sample chamber) 10, an analysis chamber 20 arranged above the preliminary exhaust chamber 10, a gate valve 30 arranged between the preliminary exhaust chamber 10 and the analysis chamber 20, a rotary pump (a vacuum pump) 40, a pressure sensor 41 detecting a pressure value p, valves 51 to 54, a control unit 160, a storage unit 70, and a display unit 71.

The preliminary exhaust chamber 10 includes a preliminary exhaust chamber housing 11 having an upper surface with an opening 11a and a lower surface with an opening 11b, and a sample holder 12 having a horizontal placement surface on which a sample S is placed. The sample holder 12 is movable between an upper position (a measuring position) at which the sample S is placed inside the preliminary exhaust chamber housing 11 while closing the opening 11b and a lower position (a replacement position) at which the sample S is placed outside the preliminary exhaust chamber housing 11. The inside of the preliminary exhaust chamber housing 11 is connected with an air release valve 54 and connected with the rotary pump 40, a pressure regulatory valve 53, and the pressure sensor 41 through an on-off valve 52.

The analysis chamber 20 includes an analysis chamber housing 21 having a lower surface with an opening 21a, an X-ray tube 22, and a detector 23. The X-ray tube 22 is installed to an upper portion of the analysis chamber housing 21 and is configured to emit primary X-rays toward the preliminary exhaust chamber 10 under the analysis chamber housing 21. The detector 23 has, for example, a housing with an introduction window, and the housing includes therein, for example, a semiconductor element for detecting the intensity of fluorescent X-rays. The detector 23 is installed to a right upper portion of the analysis chamber housing 21. The inside of the analysis chamber housing 21 is connected with the rotary pump 40, the pressure regulatory valve 53, and the pressure sensor 41 through the on-off valve 51.

The gate valve 30 has a horizontal plate body 31. The plate body 31 is movable between a left position (a disconnecting state) where the opening 11a of the preliminary exhaust chamber housing 11 and the opening 21a of the analysis chamber housing 21 are closed and a right position (a connecting state) where the opening 11a and the opening 21a communicate with each other.

A method of analyzing a plurality of samples S using the X-ray fluorescence analyzer 101 will now be described. FIG. 4 is a flowchart to illustrate the method of analysis. When analysis of a first sample S ends, the control unit 160 disconnects the inside of the analysis chamber housing 21 and the inside of the preliminary exhaust chamber housing 11 from each other by arranging the gate valve 30 at the left position (the disconnecting state) and disconnects the rotary pump 40 and the inside of the preliminary exhaust chamber housing 11 from each other by closing the on-off valve 52, in step S201 (a pressure regulation end step).

Next, in Step S202 (the pressure regulation end step), the control unit 160 disconnects the rotary pump 40 and the inside of the analysis chamber housing 21 from each other by closing the on-off valve 51 and closes the pressure regulatory valve 53. Next, in Step S203 (a sample ejecting step), the analyst opens the air release valve 54 to set the inside of the preliminary exhaust chamber housing 11 at atmospheric pressure.

Next, in Step S204 (the sample ejecting step), the analyst further replaces the first sample S with a second sample S by arranging the sample holder 12 at the lower position (the replacement position). In Step S205 (a sample introduction step), the analyst has the sample S placed inside the preliminary exhaust chamber housing 11 by arranging the sample holder 12 at the upper position (the measuring position).

With the sample holder 12 arranged at the upper position (the measuring position), in Step S206 (a preliminary exhaust step), the control unit 160 connects the rotary pump 40 and the inside of the preliminary exhaust chamber housing 11 together and changes a pressure value p2 in the preliminary exhaust chamber housing 11 from the atmospheric pressure to a rough vacuum (a predetermined pressure value P' (for example, 50 Pa)) by closing the air release valve 54 and opening the on-off valve 52.

Next, in Step S207 (a pressure regulation starting step), when the pressure value p2 decreases to the predetermined pressure value P' or less, the control unit 160 connects the rotary pump 40 and the inside of the analysis chamber housing 21 together by opening the on-off valve 51 and connects the inside of the analysis chamber housing 21 and the inside of the preliminary exhaust chamber housing 11 together by arranging the gate valve 30 at the right position (the connecting state). Subsequently, in Step S208 (the pressure regulation starting step), the control unit 160 exerts proportional-integral-derivative (PID) control using a PID parameter (a PID constant) stored in the storage unit 70 to adjust the degree of opening of the pressure regulatory valve 53 and has a pressure value p converge to a complete vacuum (a set vacuum value P (for example, 15 Pa)). In other words, the control unit 60 changes a pressure value p1 in the analysis chamber housing 21 and the pressure value p2 in the preliminary exhaust chamber housing 11 to the set vacuum value P.

Next, when the pressure value p stabilizes at the set vacuum value P, the control unit 160 irradiates the sample S with primary X-rays and detects the intensity of fluorescent X-rays generated from the sample S using the detector 23, in Step S209 (an analyzing step). Upon detection of the intensity of fluorescent X-rays, in Step S210 (the analyzing step), the control unit 160 stops irradiating the sample S with the primary X-rays to end the analysis, and displays results of the analysis on the display unit 71.

CITATION LIST

Patent Document

PATENT DOCUMENT 1: Japanese Unexamined Patent Publication No. H06-331574

SUMMARY

Technical Problem

With the above-described method of analysis, in Step S208, the control unit 160 exerts PID control to adjust the degree of opening of the pressure regulatory valve 53 and changes the pressure value p1 and the pressure value p2 to the set vacuum value P. This method, however, has difficulty in tuning the pressure regulatory valve 53 to an optimal PID parameter, which allows short-time adjustment of the degree of opening of the pressure regulatory valve 53, because individual pressure regulatory valves 53 have significantly different characteristics, and the characteristics vary depending on the outside temperature. Such a PID parameter is therefore used that gradually adjusts the degree of opening of the pressure regulatory valve 53, which problematically takes time to change the pressure value p1 and the pressure value p2 to the set vacuum value P.

The X-ray fluorescence analysis, which allows immediate quantification of a plurality of kinds of trace elements contained in iron and steel and non-ferrous materials, is used at manufacturing plants and other similar sites to analyze samples S one after another in steel making and refining processes. In the analysis, however, changing the pressure value p1 and the pressure value p2 to the set vacuum value P problematically occupies a large proportion of time in a measurement time necessary per analysis. It is therefore an object of the present invention to provide an analyzer capable of having a pressure value converge to the set vacuum value P in a short time.

Solution to the Problem

In order to achieve the object, an analyzer according to the present invention includes a sample chamber in which a sample is placed, an analysis chamber including an irradiator and a detector, a gate valve configured to switch between a connecting state where the inside of the sample chamber and the inside of the analysis chamber are connected together and a disconnecting state where the insides of the chambers are disconnected from each other, a vacuum pump connected to the inside of the sample chamber and to the inside of the analysis chamber, a pressure regulatory valve connected to the inside of the sample chamber and to the inside of the analysis chamber, and a control unit configured to exert PID control on the degree of opening of the pressure regulatory valve to set an internal pressure of the sample chamber and an internal pressure of the analysis chamber at respective set pressure values in the connecting state. The control unit exerts PID controls on the degree of opening of the pressure regulatory valve to set an internal pressure of the analysis chamber at the set pressure values in the connecting state, stores the degree of opening of the pressure regulatory valve controlled in the disconnecting state, and controls the degree of opening of the pressure regulatory valve in the connecting state based on the degree of opening of the pressure regulatory valve in the disconnecting state.

The value may be, for example, 15 Pa. In order to achieve the object, another analyzer according to the present invention includes a sample chamber in which a sample is placed, an analysis chamber including an irradiator and a detector, a gate valve configured to switch between a connecting state where the inside of the sample chamber and the inside of the analysis chamber are connected together and a disconnecting state where the insides of the chambers are disconnected from each other, a vacuum pump connected to the inside of the sample chamber and to the inside of the analysis chamber, a pressure regulatory valve connected to the inside of the sample chamber and to the inside of the analysis chamber, and a control unit configured to exert PID control on the degree of opening of the pressure regulatory valve to set an internal pressure of the sample chamber and an internal pressure of the analysis chamber at respective set pressure values in the connecting state. The control unit exerts PID control on the degree of opening of the pressure regulatory valve to set the internal pressure of the analysis chamber at the set pressure value in the disconnecting state, stores the degree of opening of the pressure regulatory valve controlled in the connecting state, and controls the degree of opening of the pressure regulatory valve in the disconnecting state based on the degree of opening of the pressure regulatory valve in the connecting state. The "set pressure value" is a pressure value predetermined by a designer or any other person and used to analyze a sample.

Advantages of the Invention

With the analyzer of the present invention, a longer time (in the disconnecting state) from ejection of a sample to introduction of the next sample allows a pressure value to immediately converge to a set vacuum value P in the connecting state even when a change (including, for example, deterioration with age) in the outside temperature or other elements occurs during the longer time to affect operation of the pressure regulatory valve. This configuration can improve the throughput.

Solutions to Other Problems and Advantages of Solutions

In the above-described invention, the control unit may exert PID control to control the degree of opening of the pressure regulatory valve.

In the above-described invention, the control unit may store the degree of opening of the pressure regulatory valve controlled in the disconnecting state and controls the degree of opening of the pressure regulatory valve in the connecting state based on the degree of opening of the pressure regulatory valve in the disconnecting state. In the above-described invention, the control unit may store the degree of opening of the pressure regulatory valve controlled to set the internal pressure of a sample chamber and the internal pressure of an analysis chamber at respective set pressure values in the connecting state and control the degree of opening of the pressure regulatory valve in the disconnecting state based on the degree of opening of the pressure regulatory valve in the connecting state.

In the above-described invention, the irradiator may be an X-ray tube irradiating the sample with X-rays, and the detector may detect X-rays from the sample.

DETAILED DESCRIPTION

Embodiments of the present invention will now be described with reference to the drawings. It should be noted that the present invention is not limited to the following embodiments and includes various aspects without departing from the scope of the present invention.

Figure 1:
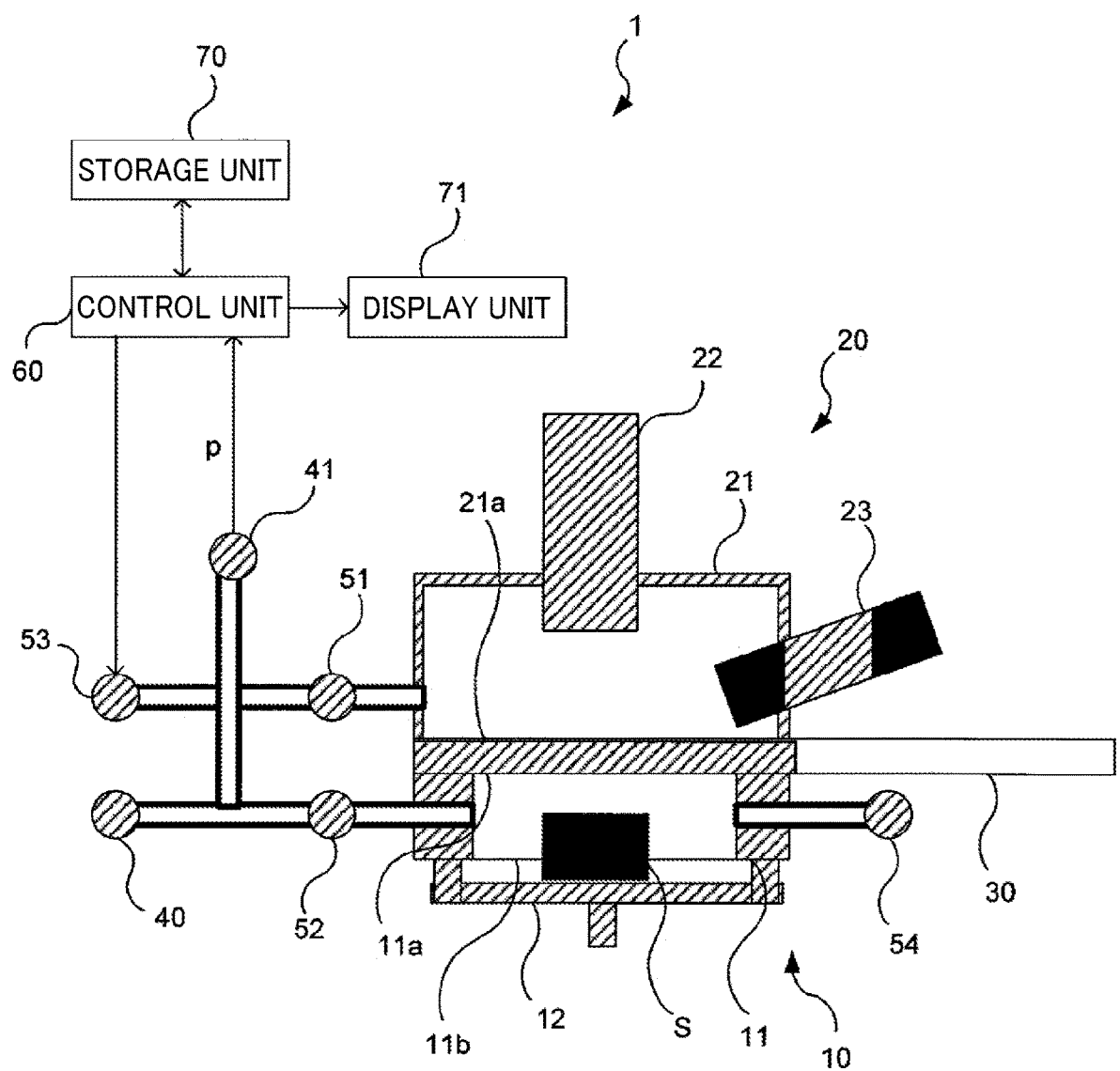
FIG. 1 is a schematic diagram of a configuration of an exemplary simultaneous X-ray fluorescence analyzer according to an embodiment of the present invention.

FIG. 1 is a schematic diagram of a configuration of an exemplary simultaneous X-ray fluorescence analyzer according to an embodiment of the present invention. Like numerals indicate like components of the above-described simultaneous X-ray fluorescence analyzer 101. A simultaneous X-ray fluorescence analyzer 1 includes a preliminary exhaust chamber (a sample chamber) 10, an analysis chamber 20 arranged above the preliminary exhaust chamber 10, a gate valve 30 arranged between the preliminary exhaust chamber 10 and the analysis chamber 20, a rotary pump (a vacuum pump) 40, a pressure sensor 41 detecting a pressure value p, valves 51 to 54, a control unit 60, a storage unit 70, and a display unit 71. The X-ray fluorescence analyzer 1 according to the embodiment of the present invention differs from the known X-ray fluorescence analyzer 101 only in the control unit 60.

Figure 2:
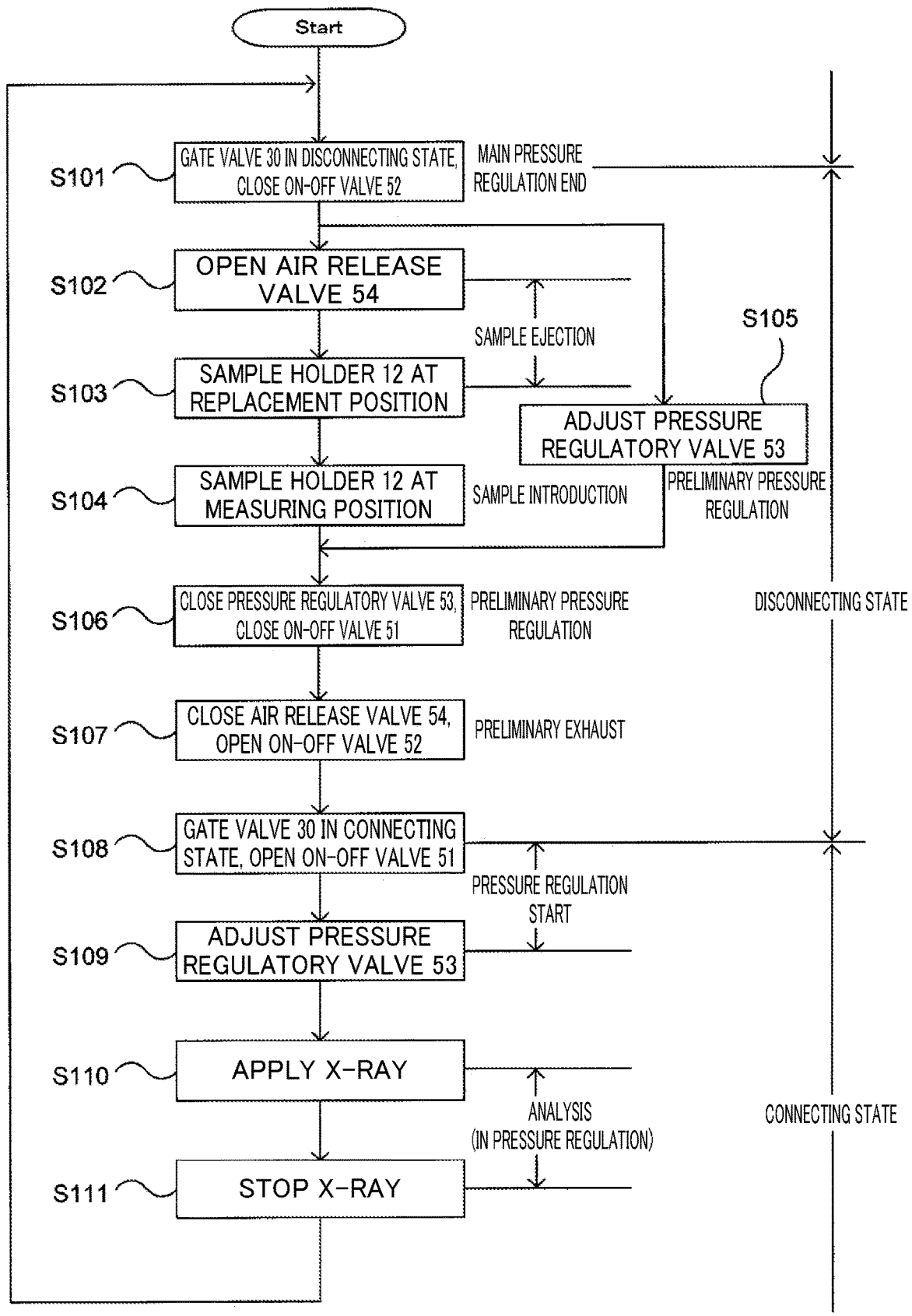
FIG. 2 is a flowchart for illustration of a method of analysis.
Figure 3:
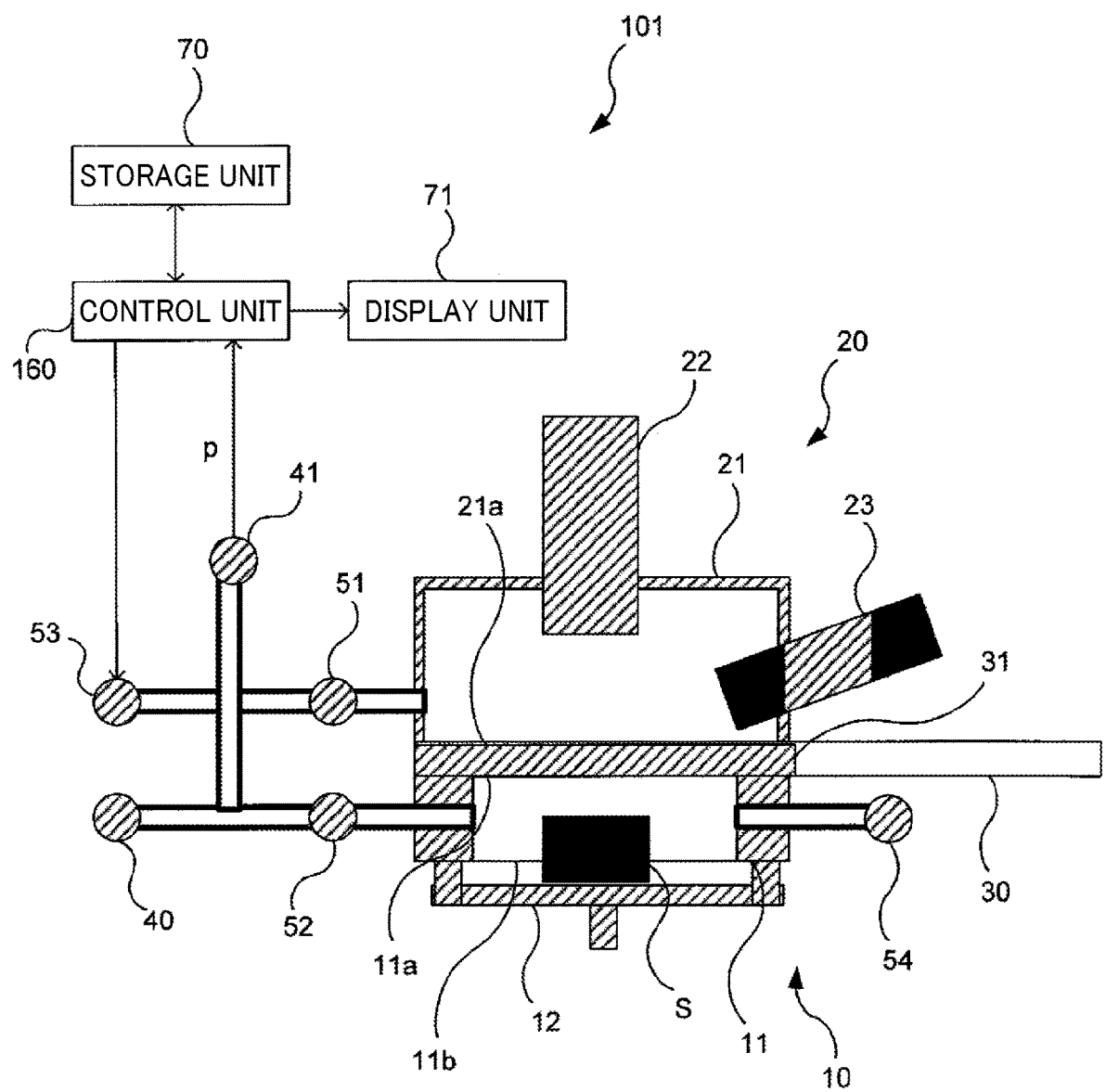
FIG. 3 is a schematic diagram of a configuration of a known simultaneous X-ray fluorescence analyzer.
Figure 4:
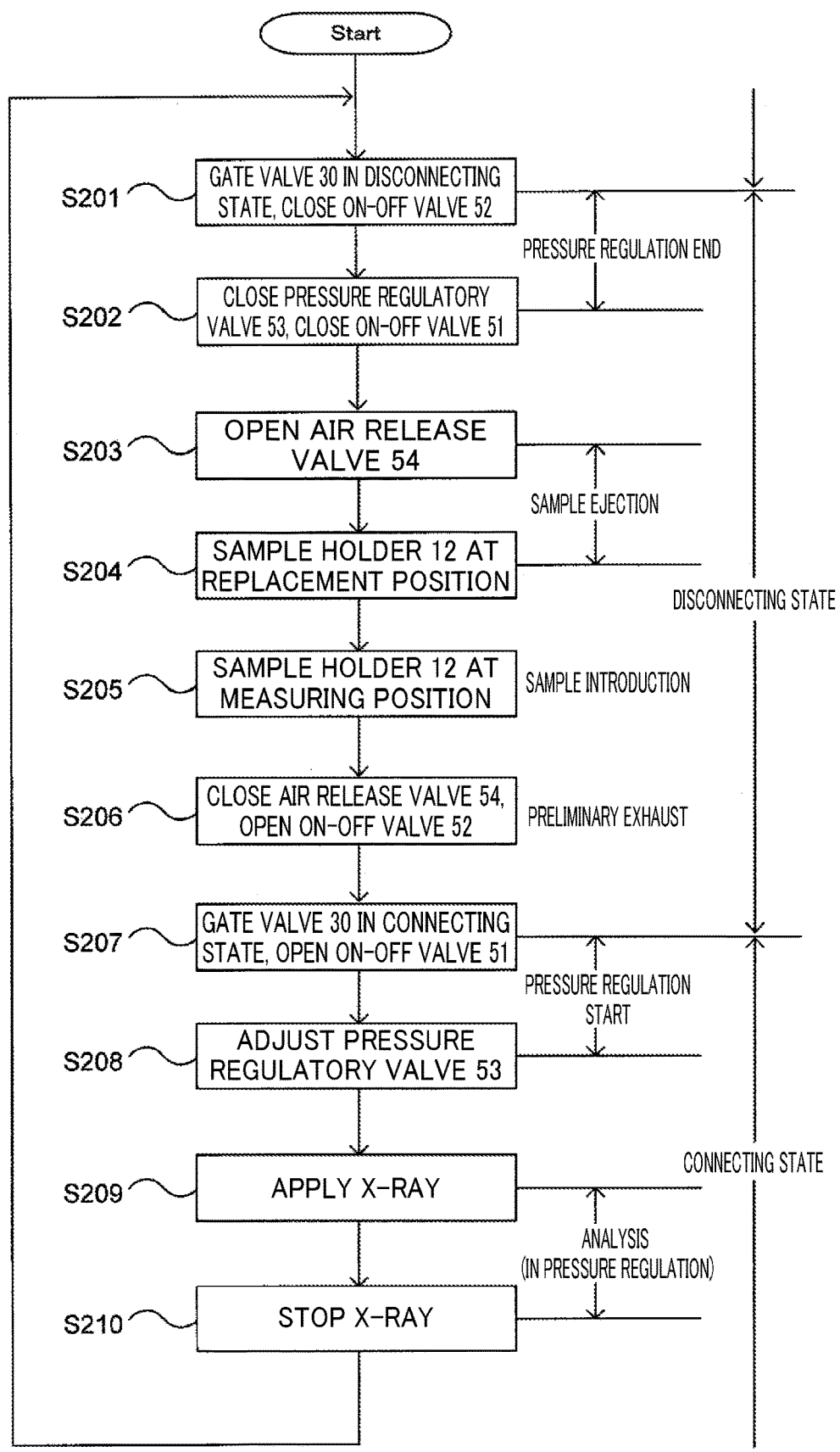
FIG. 4 is a flowchart for illustration of a method of analysis.

A method of analyzing a plurality of samples S using the X-ray fluorescence analyzer 1 will now be described. FIG. 2 is a flowchart to illustrate the method of analysis. When analysis of a first sample S ends, the control unit 60 disconnects the inside of the analysis chamber housing 21 and the inside of the preliminary exhaust chamber housing 11 from each other by arranging the gate valve 30 at the left position (the disconnecting state) and disconnects the rotary pump 40 and the inside of the preliminary exhaust chamber housing 11 from each other by closing the on-off valve 52, in Step S101 (a main pressure regulation end step). At the main pressure regulation end step, the degree of opening of the pressure regulatory valve 53, which is controlled to change the pressure value p1 in the analysis chamber housing 21 and the pressure value p2 in the preliminary exhaust chamber housing 11 to a set vacuum value P, may be stored and used for control of the pressure regulatory valve 53 in the disconnecting state. Next, in Step S102 (a sample ejecting step), the analyst opens the air release valve 54 to set the inside of the preliminary exhaust chamber housing 11 at atmospheric pressure.

Next, in Step S103 (the sample ejecting step), the analyst further replaces the first sample S with a second sample S by arranging the sample holder 12 at a lower position (a replacement position). In Step S104 (a sample introduction step), the analyst has the sample S placed inside the preliminary exhaust chamber housing 11 by arranging the sample holder 12 at an upper position (a measuring position).

Upon end of Step S101, in Step S105 (a preliminary pressure regulation step), the control unit 60 exerts proportional-integral-derivative (PID) control using a PID parameter stored in the storage unit 70 to adjust the degree of opening of the pressure regulatory valve 53 and has the pressure value p1 converge to the set vacuum value P. If the control unit 60 stores the degree of opening (a control value) of the pressure regulatory valve 53 in Step S101 or Step S109, the control unit 60 may exert PID control using the stored degree of opening (the control value) of the pressure regulatory valve 53 and a PID parameter (a PID constant) stored in the storage unit 70 to adjust the degree of opening of the pressure regulatory valve 53 and have the pressure value p1 converge to the set vacuum value P. With the sample holder 12 arranged at the upper position (the measuring position), in Step S106 (the preliminary pressure regulation step), the control unit 60 stores the degree of opening (the control value) of the pressure regulatory valve 53, which is controlled to change the pressure value p1 in the analysis chamber housing 21 to the set vacuum value P in Step S105, in the storage unit 70, disconnects the rotary pump 40 and the inside of the analysis chamber housing 21 from each other by closing the on-off valve 51, and closes the pressure regulatory valve 53.

In Step S107 (a preliminary exhaust step), the control unit 60 connects the rotary pump 40 and the inside of the preliminary exhaust chamber housing 11 together and changes the pressure value p2 in the preliminary exhaust chamber housing 11 from the atmospheric pressure to a rough vacuum (a predetermined pressure value P') by closing the air release valve 54 and opening the on-off valve 52.

In Step S108 (a pressure regulation starting step), when the pressure value p2 decreases to the predetermined pressure value P' or less, the control unit 60 connects the rotary pump 40 and the inside of the analysis chamber housing 21 together by opening the on-off valve 51 and connects the inside of the analysis chamber housing 21 and the inside of the preliminary exhaust chamber housing 11 together by arranging the gate valve 30 at the right position (the connecting state). In Step S109 (the pressure regulation starting step), the control unit 60 exerts PID control using a PID parameter (a PID constant) stored in the storage unit 70 and the degree of opening (the control value) of the pressure regulatory valve 53 stored in Step S106 to adjust the degree of opening of the pressure regulatory valve 53, and has the pressure value p converge to a set vacuum value (a complete vacuum) P. In other words, the control unit 60 changes the pressure value p1 in the analysis chamber housing 21 and the pressure value p2 in the preliminary exhaust chamber housing 11 to the set vacuum value P. Use of the degree of opening (the control value) of the pressure regulatory valve 53 stored in Step S106 allows the control unit 60 to immediately have the pressure value p converge to the set vacuum value P.

Next, when the pressure value p stabilizes at the set vacuum value P, the control unit 60 irradiates the sample S with primary X-rays and detects the intensity of fluorescent X-rays generated from the sample S using the detector 23, in Step S110 (an analyzing step). Upon detection of the intensity of fluorescent X-rays, in Step S111 (the analyzing step) of Step S111, the control unit 60 stops irradiating the sample S with the primary X-rays to end the analysis, and displays results of the analysis on the display unit 71.

As can be seen from the foregoing description, with the X-ray fluorescence analyzer 1 of the present invention, a longer time (in the disconnecting state) from ejection of the sample S to introduction of the next sample S allows a pressure value to immediately converge to the set vacuum value P in Step S109 even when a change (including, for example, deterioration with age) in the outside temperature or other elements occurs during the longer time to affect operation of the pressure regulatory valve 53. This configuration can improve the throughput.

Other Embodiments

Although the above-described embodiment uses the X-ray fluorescence analyzer 1 as an example, the present invention is similarly applicable to an electron beam application device and other similar devices.

INDUSTRIAL APPLICABILITY

The present invention is useful for an X-ray fluorescence analyzer and other similar devices that acquire information on an element contained in a sample.

DESCRIPTION OF REFERENCE CHARACTERS

1 X-ray Fluorescence Analyzer
10 Sample Chamber
20 Analysis Chamber
22 X-ray Tube
23 Detector
30 Gate Valve
40 Vacuum Pump
41 Pressure Sensor
53 Pressure Regulatory Valve
60 Control Unit

The invention claimed is:

1. An analyzer, comprising:
   a sample chamber in which a sample is placed;
   an analysis chamber including an irradiator and a detector;
   a gate valve configured to switch between a connecting state where an inside of the sample chamber and an inside of the analysis chamber are connected together and a disconnecting state where the insides of the chambers are disconnected from each other;
   a vacuum pump connected to the inside of the sample chamber and the inside of the analysis chamber;
   a pressure regulatory valve connected to the inside of the sample chamber and the inside of the analysis chamber; and
   a control unit configured to exert proportional-integral-derivative (PID) control on a degree of opening of the pressure regulatory valve to set an internal pressure of the sample chamber and an internal pressure of the analysis chamber at respective set pressure values in the connecting state,
   wherein
   the control unit exerts PID control on the degree of opening of the pressure regulatory valve to set an internal pressure of the analysis chamber at set pressure values in the disconnecting state, stores the degree of opening of the pressure regulatory valve controlled in the disconnecting state as a stored value, and controls the degree of opening of the pressure regulatory valve in the connecting state based on the stored value.

2. The analyzer of claim 1, wherein
   the irradiator is an X-ray tube irradiating the sample with an X-ray, and the detector detects an X-ray from the sample.

3. An analyzer, comprising:
   a sample chamber in which a sample is placed;
   an analysis chamber including an irradiator and a detector;
   a gate valve configured to switch between a connecting state where an inside of the sample chamber and an inside of the analysis chamber are connected together and a disconnecting state where the insides of the chambers are disconnected from each other;
   a vacuum pump connected to the inside of the sample chamber and the inside of the analysis chamber;
   a pressure regulatory valve connected to the inside of the sample chamber and the inside of the analysis chamber; and
   a control unit configured to exert proportional-integral-derivative (PID) control on a degree of opening of the pressure regulatory valve to set an internal pressure of the sample chamber and an internal pressure of the analysis chamber at respective set pressure values in the connecting state,
   wherein
   the control unit exerts PID control on the degree of opening of the pressure regulatory valve to set the internal pressure of the analysis chamber at the set pressure value in the disconnecting state, stores the degree of opening of the pressure regulatory valve controlled in the connecting state, and controls the degree of opening of the pressure regulatory valve in the disconnecting state based on the degree of opening of the pressure regulatory valve in the connecting state.

4. The analyzer of claim 3, wherein
   the irradiator is an X-ray tube irradiating the sample with an X-ray, and the detector detects an X-ray from the sample.

* * * * *